Figure 1:
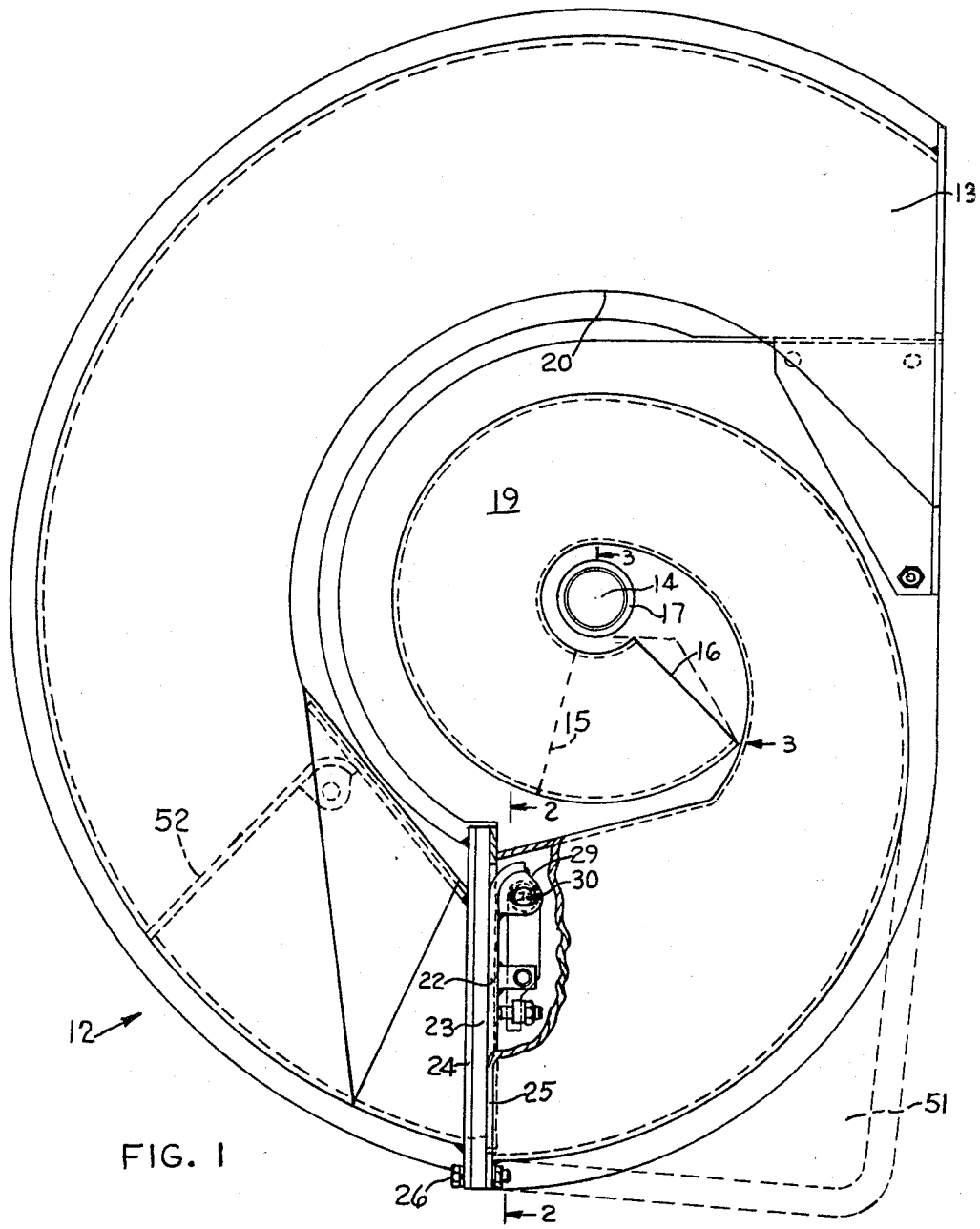

Oct. 25, 1966  C. W. WOLFE  3,280,993
SPIRAL LOADING CHUTE FOR ROTARY FURNACES
Filed Sept. 13, 1965  2 Sheets-Sheet 1

INVENTOR.
CHARLES W. WOLFE
BY
ATTORNEY

Oct. 25, 1966   C. W. WOLFE   3,280,993
SPIRAL LOADING CHUTE FOR ROTARY FURNACES
Filed Sept. 13, 1965                                    2 Sheets-Sheet 2
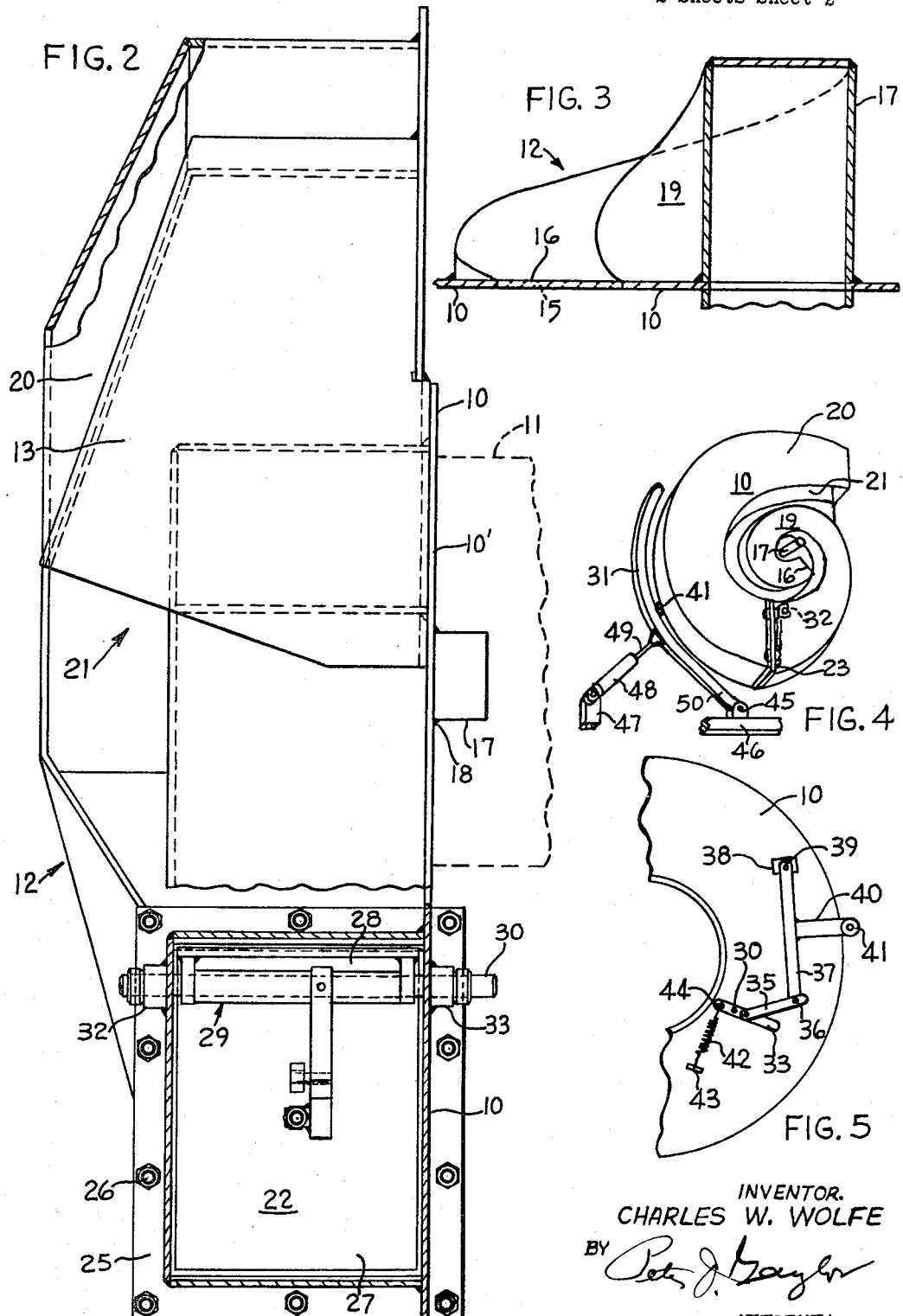
INVENTOR.
CHARLES W. WOLFE
BY
ATTORNEY

United States Patent Office 3,280,993  
Patented Oct. 25, 1966

3,280,993  
SPIRAL LOADING CHUTE FOR ROTARY FURNACES  
Charles W. Wolfe, 133 Twin Falls Road, Berkeley Heights, N.J.  
Filed Sept. 13, 1965, Ser. No. 486,869  
5 Claims. (Cl. 214—18)

This invention deals with a loading chute serving as the charging end of a rotary furnace. More specifically, it relates to a spiral loading chute containing at least one gate and having a centrally-disposed atmosphere inlet.

Conventional rotary retort furnaces, such as those employed for heat treating metal parts in special gaseous atmospheres, have a number of disadvantages. For example, the metal parts, which are fed intermittently into the inlet end of the retort in pre-measured amounts, are fed into the furnace from a height such that their dropping into the furnace often entails damage to the parts. Such damage is often accentuated by the fact that the parts are fed as one large tumbling mass wherein considerable rubbing and pounding between the individual pieces takes place.

Another disadvantage of conventional rotary furnaces is that the atmosphere gas, of necessity, cannot be readily introduced through the feed end of the furnace retort, but must be introduced through the discharge end or through some other portion of the retort, thereby involving adverse effects on atmosphere pressure and purity.

According to the present invention, a rotary furnace feeder is provided which gradually and gently introduces the feed pieces into the feed end of the retort screw, without unnecessary tumbling or dropping of the parts from damaging heights. Furthermore, the present invention provides a means for introducing gaseous atmosphere through the feed end of the retort, whereby atmosphere pressure is maintained and contamination is greatly minimized. Other advantages will become apparent from the subsequent description.

The invention will be more readily understood by reference to the accompanying drawings in which FIGURE 1 depicts a front elevational view of a preferred loading chute of the present invention, with a portion of the chute top cut away to show details of the gate. FIGURE 2 illustrates a side elevational view thereof, with a portion shown in cross-section on a plane taken along line 2—2 of FIGURE 1, to show details of the enclosed gate. FIGURE 3 presents a cross-sectional side view, taken along line 3—3 in FIGURE 1. FIGURE 4 shows a perspective front view of the same loading chute in combination with a portion of the gate-opening assembly, while FIGURE 5 depicts a back elevational view of the same loading chute showing the remaining portion of the gate-opening assembly. The same numerals refer to similar parts in the various figures.

Referring again to the drawings, numeral 10 designates a flat metal back plate serving as the base for the loading chute of the present invention, and the central portion 10′ of which serves as an end to the otherwise open-end conventional furnace retort 11 having a conventional fixed inner feed screw (not shown) for moving the parts fed therein lengthwise through the furnace.

The spiral body of the loading chute (which, in a general way, resembles a sea shell, and which is mounted on back plate 10), is designated generally as 12. It begins with a wide open hopper feeding portion 13, and spirals inwardly, as it is reduced both radially and axially in cross-section, around the furnace retort center 14, until it terminates near the center of plate 10 at the opening 15 in the latter, which opening is positioned so that the parts to be treated are delivered onto the surface of the feed screw of the retort, without dropping. In other words, end 16 of the spiral 12 serves as an extension of the retort feed screw.

Centrally disposed (with respect to the furnace retort), is atmosphere inlet pipe 17, which penetrates plate portion 10′ at 18, in outside sealing relation therewith. It will be noted that the narrowing end 19 of the spiral chute is disposed around pipe 17. The atmosphere gas is fed through a pipe (not shown) connected to pipe 17 by a swing joint or other moving joint (not shown).

The open feed end 13 of the spiral chute has an outwardly-directed flare 20 to facilitate intermittent charging into the inner feed bin 21 (FIGURE 4) of a pre-measured amount of parts to be treated in the furnace, as the furnace retort 11, and its attached chute 12 are continuously rotated. It is preferred that the spiral chute 12 extend for a distance slightly over one revolution, i.e., over 360°.

At a point, say, about 180° from the entrance of the spiral chute 12, is mounted a gate 22. This gate is disposed across the width of the chute at that point, and it is designed to open inwardly, in the direction of feed. The purpose of gate 22 is to close off and seal the furnace, since discharge opening 15 in plate 10 is always open. Gate 22 closes against plate 23, which is mounted between flanges 24 and 25 of the chute 12, by means of bolts 26. The flapper portion of gate 22 is the outer portion 27, while the inner portion 28 is affixed to a hinge 29, the pivot 30 of which projects through the rear of back plate 10, to be contacted by upright element 31 of the gate opening assembly (FIGURE 4), as will be outlined further. Pivot 30 of hinge 29 is mounted in bearing 32 in the outer portion of spiral 12, and in bearing 33 affixed to the rear of plate 10.

As can be seen from FIGURE 5, pivot 30 of gate hinge 29 is affixed to arm 33 having a pivot 34, on which swivels the end of arm 35. The other end of arm 35 swivels on pivot 36 attached to arm 37, whose other end is swivably attached at 39 to boss 38, affixed to the back of plate 10. Attached to arm 37 is another arm 40, at the end of which is a contact wheel 41. Wheel 41 protrudes beyond the periphery of plate 10 and thus is able to be moved by upright member 31 (FIGURE 4). The end 44 of arm 33, protruding inwardly beyond pivot 30, is attached to a spring 42 whose other end is affixed to plate 10 at 43. From the foregoing, it is apparent that, when wheel 41 is pushed inwardly by member 31, the combined lever action will turn pivot 30 and open gate 22. When pressure is removed from wheel 41, spring 42 returns the gate to closed position.

From FIGURE 4, it becomes apparent that curved upright 31 is attached at its lower end, in swiveling relation, at pivot 45, to member 46 of the frame support of the furnace. On another furnace frame member 47, is mounted a pneumatic or hydraulic cylinder 48 having its piston end 49 thrust against upright member 31. By adjusting the amount of extension of piston 49, it is possible to adjust the point on member 31 to be contacted by wheel 41 and, thus it is possible to regulate the time of opening of gate 22, and its closing when wheel 41 leaves end 50 of upright member 31. It is of course, understood that other methods may be employed for operating the gate.

Although the chute 12 has been shown as having a generally round spiral shape, it is possible to insert pockets or protrusions in the spiral. For example, the portion beyond gate 22 (FIGURE 1) may be provided with an angular shaped pocket 51 into which the parts may flow prior to being fed into the furnace. A shorter period of gate opening may be utilized to minimize leakage of atmosphere through the open gate. Also, although one gate if shown, it is possible to incorporate other gates in the design. For example, a gate 52 (FIGURE 1) may be provided ahead of gate 22 to insure better sealing off of the furnace retort.

When in operation, the chute 21 is, of course, rotating at the same speed as that of furnace retort 11. When inlet end 20 comes to the bottom, the measured charge of parts to be treated is poured therein by an automatic feeder, or otherwise. As rotation continues, wheel 41 contacts upright 31 at a predetermined point, whereupon gate 22 is opened, and the parts flow into the normally closed-off or sealed portion of spiral chute 12. Then, at a predetermined point, wheel 41 breaks contact with upright 31, and gate 22 is closed, thereby sealing the portion of the chamber now containing the parts, which continue to move along the spiral, as it is rotated, until the parts reach opening 15 in plate 10, whereupon the parts slide onto the inner screw of retort 11, through the retort to the discharge end thereof. Meanwhile, the necessary treating atmosphere is fed into the retort through pipe 17.

I claim:
1. A loading chute for a rotary retort furnace having a frame carrying a retort with an open feed end and a feeding screw therein, comprising,
   a back plate serving to cover the open end of said retort in outside sealing relation, and extending beyond the periphery thereof,
   a spiral chute mounted on said plate and having an open larger hopper entrance end and a hollow body spiralling inwardly around the axis of said retort with a gradually narrowing body and having its narrower end attached to near the center of said plate in outside sealing relation,
   an opening in said plate circumscribing the inner periphery of said narrower body end and disposed in line with said retort feeding screw in a manner so as to serve as a feed continuation of said retort screw,
   an inwardly opening gate mounted beyond the entrance of said chute and designed to seal off said chute,
   gate opening and closing means for opening and closing said gate at predetermined rotation positions of said chute for permitting passage of feed, and
   an atmosphere feed pipe mounted on said retort and penetrating said plate in outside sealing relation.

2. A loading chute according to claim 1 in which said spiral chute extends over a distance of about 360°.

3. A loading chute according to claim 1 in which said gate is disposed about 180° from the entrance end of said chute.

4. A loading chute according to claim 1 in which said gate closing means are mounted on the extending portion of said back plate, and
   said co-acting gate closing means are mounted on the frame of said furnace.

5. A loading chute according to claim 4 in which said gate closing means on said plate comprises a protrusion connected by levers to said gate, and the co-acting means comprises a curved upright adjustably mounted with respect to said plate and designed to push said protrusion to open said gate, and release said protrusion to close said gate.

References Cited by the Examiner
UNITED STATES PATENTS

| | | | |
|---|---|---|---|
| 1,623,527 | 4/1927 | Deer | 214—18 |
| 2,345,092 | 3/1944 | Breslau | 214—18 X |
| 2,617,545 | 11/1952 | Cambell | 214—18 |
| 2,923,538 | 2/1960 | Schoonover. | |
| 3,093,753 | 6/1962 | Eketorp et al. | |

GERALD M. FORLENZA, *Primary Examiner.*

R. G. SHERIDAN, *Assistant Examiner.*